Sept. 29, 1953     E. E. GRANGER     2,653,583
WATER HEATER
Filed Sept. 8, 1949
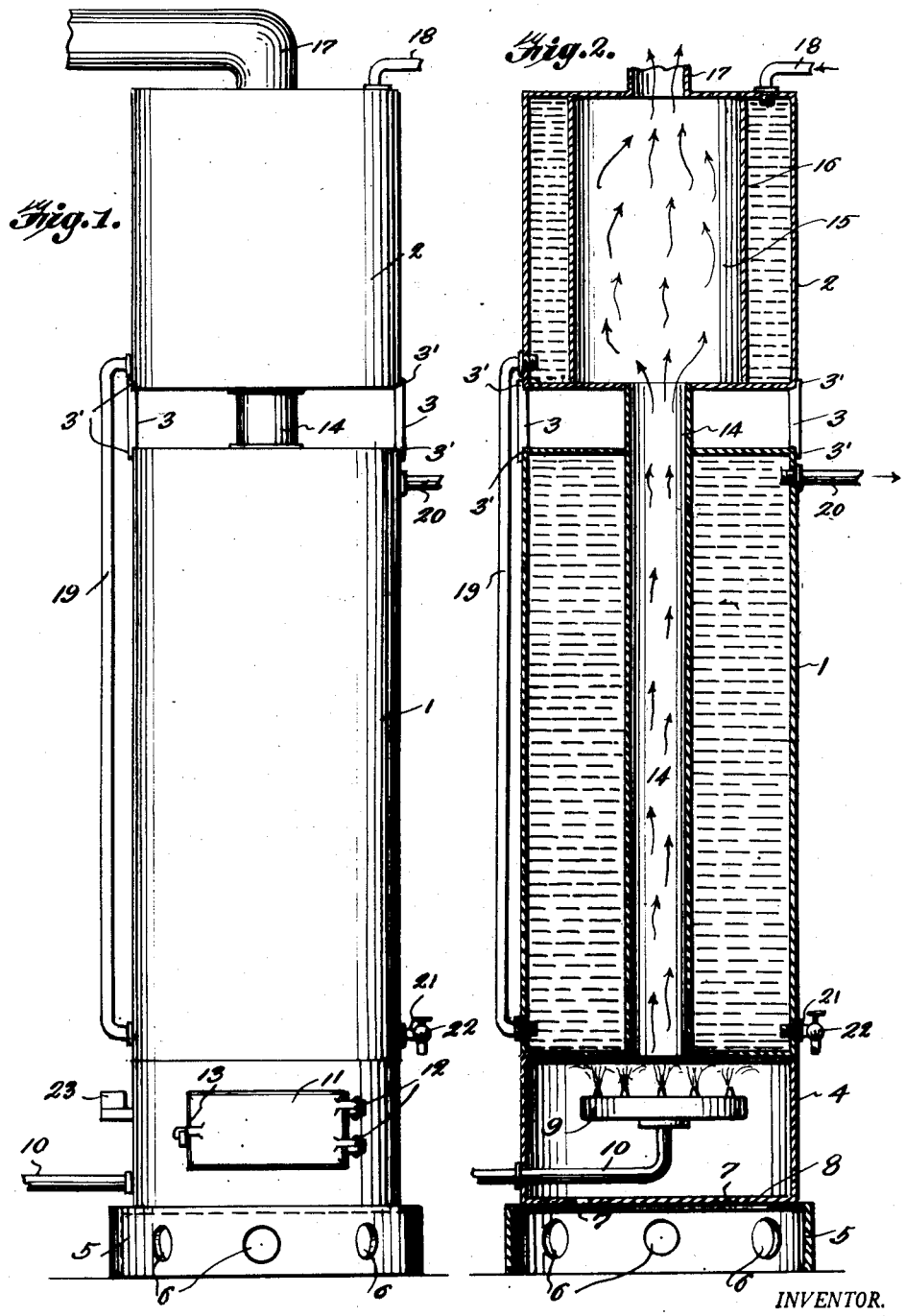
INVENTOR.
ELMER E. GRANGER
BY
ATTY

Patented Sept. 29, 1953

2,653,583

UNITED STATES PATENT OFFICE 2,653,583

WATER HEATER

Elmer E. Granger, Reno, Nev.

Application September 8, 1949, Serial No. 114,499

1 Claim. (Cl. 122—125)

This invention relates to water heaters and more particularly to a heater of the type including a vertical casing having a heater at its bottom and a flue passing vertically through the casing so that hot gases may flow upwardly through the flue and heat the same, thereby causing water in the casing to be heated by action of the hot flue.

One object of the invention is to provide a water heater wherein there is provided an upper or supplemental casing supported above the main casing and with which the upper end of the flue communicates, thus permitting water to be preheated before it is delivered into the main casing where heating is completed and from which water to be used is drawn.

Another object of the invention is to provide a water heater wherein the main casing and the auxiliary casing are both of cylindrical formation and have flues passing vertically through them, the flue of the auxiliary casing being of such diameter that it forms a large heating chamber in which a large quantity of hot gases may accumulate and effect a very good preheating of water.

Another object of the invention is to provide a water heater having a main casing and an upper auxiliary casing, cold water being delivered into the upper auxiliary casing through the top thereof so that the water will be heated in an efficient manner as it flows downwardly towards the bottom of this casing where it passes downwardly through a pipe and into the main casing at the lower end thereof for contact with the heated bottom of the main casing and also with the flue of the main casing as it flows upwardly in the main casing.

Another object of the invention is to so arrange the two casings that the upper end portion of the flue in the main casing which projects from the top of this casing may serve as a support for the auxiliary casing which is additionally supported by struts extending vertically between marginal portions of the two casings. The invention is illustrated in the accompanying drawings wherein:

Fig. 1 is a side elevation of the improved water heater.

Fig. 2 is a sectional view taken vertically through the water heater.

This improved water heater has a main casing 1 and an auxiliary casing 2. The two casings extend vertically and are of cylindrical formation, the main casing being of appreciably greater height than the auxiliary casing and of the same diameter. Struts 3 extend vertically between marginal portions of the casings to support the auxiliary casing above the main casing and have their ends formed with tongues 3' which overlap sides of the casings and serve to more securely hold the struts in place and also brace the upper casing against transverse movement out of a position directly over the main casing. Any number of struts desired may be used.

The main casing rests upon a fire box 4 which is also of cylindrical formation and has a base 5 which is formed with a suitable number of openings 6 through which air may enter the base and flow upwardly through openings 7 in the bottom 8 of the fire box to supply oxygen to the gas burner 9 which is disposed horizontally in the fire box and supported by the upper end of the upwardly extending inner end portion of a gas pipe 10 which enters the fire box through a side thereof. A door 11 is mounted for opening and closing movements by hinges 12 and a latch 13 normally holds the door closed. The burner is disposed under the lower end of a flue 14 mounted vertically through the main casing and projecting from the upper end thereof, and from an inspection of Figure 2 it will be seen that when the heater is in operation hot gases and other products of combustion will flow upwardly through the flue and water in the main casing will be heated by contact with the flue.

The upper end of the flue 14 is mounted through an opening formed at the center of the bottom of the auxiliary casing 2 and communicates with a heating chamber 15 formed in this casing by a cylindrical flue 16. This flue 16 is of appreciably greater diameter than the flue 14 and forms a large heating chamber of such dimensions that a large quantity of hot gases may accumulate therein before passing out through the pipe 17 which leads from the center of the top of the auxiliary casing and will be of sufficient length to extend to a chimney. The space between the flue 16 and the annular wall of the auxiliary casing forms a water chamber of considerably less capacity than the water chamber of the main casing and as the flue 16 is highly heated by the hot gases flowing through the heating chamber 15 water flowing through the auxiliary casing will be very effectively heated for a preheating before it is delivered to the main casing. The cold water enters the water chamber of the auxiliary casing through a pipe 18 mounted through the top of the auxiliary casing and heated water is delivered to the main casing through a pipe 19 leading from the bottom of the auxiliary casing to the bottom of the main casing. Water flows downwardly through the auxiliary casing and upwardly through the main casing and its speed of flow is such that by the time the water has passed through both casings it will be very hot. The preheated water enters the main casing close to the bottom thereof and as the burner 9 is of greater dimension than the diameter of the flue 14 the bottom of the main casing will be highly heated and the water will be initially warmed by contact with the bottom of the main casing before it flows upwardly. A good deal of heat is absorbed by water in the main casing but as the heating chamber 15 is of large dimensions and the hot gases must fill the chamber before they can flow out through the pipe 17 they will remain in the auxiliary casing a sufficient length of time to impart a good preliminary heating to the smaller quantity of water flowing downwardly through the auxiliary casing. An outlet pipe 20 leads from the upper end of the main casing and at its lower end there has been provided a drain pipe 21 controlled by a valve 22. Since the flue 14 projects upwardly from the main casing and is rigidly secured through the opening in the bottom of the auxiliary casing it serves to support the central portion of the auxiliary casing and brace the auxiliary casing against transverse movements as well as for delivering hot gases into the heating chamber 15. A conventional thermostat 23 controls operation of the water heater.

Having thus described the invention, what is claimed is:

A water heater comprising a vertically disposed cylindrical main casing having a top wall and a bottom wall and an annular wall, a fire box under said main casing rigidly connected therewith and constituting a support for the same, a tubular flue extending vertically in the main casing centrally thereof and having its lower end secured about an opening formed centrally of the bottom and its upper portion projecting upwardly above the main casing through an opening in the top centrally thereof, a cylindrical auxiliary casing over the main casing spaced upwardly therefrom and having a top wall and a bottom wall and an annular wall, the upper end of said flue being secured to the bottom wall of the auxiliary casing about an opening formed centrally therein, a tubular flue of appreciably greater diameter than the first flue extending vertically in the auxiliary casing and having its lower end secured to the bottom wall of the auxiliary casing about the opening therein and in concentric spaced relation to the annular wall of the auxiliary casing and to the opening in its bottom wall, the upper end of the flue in the auxiliary casing being secured to the top wall thereof in surrounding and spaced concentric relation to an outlet opening formed centrally thereof for escape of products of combustion passing upwardly from the fire box through the flues, struts disposed vertically between the casings in spaced relation to each other circumferentially thereof and having upper and lower ends secured to peripheral portions of the casings, and water pipes connected with the casings.

ELMER E. GRANGER.

References Cited in the file of this patent

UNITED STATES PATENTS

| Number | Name | Date |
|---|---|---|
| 83,016 | Anderson | Oct. 13, 1868 |
| 368,489 | Patton | Aug. 16, 1887 |
| 482,787 | Crosby | Sept. 20, 1892 |
| 772,972 | Stilwell | Oct. 25, 1904 |
| 796,372 | Tuttle | Aug. 1, 1905 |
| 884,431 | Tracy | Apr. 14, 1908 |
| 2,311,469 | Pruitt | Feb. 16, 1943 |

FOREIGN PATENTS

| Number | Country | Date |
|---|---|---|
| 2,332 | Great Britain | July 24, 1863 |
| 476,016 | Great Britain | Nov. 30, 1937 |